United States Patent [19]
Martin

[11] 3,960,028
[45] June 1, 1976

[54] ROTOR ALIGNMENT APPARATUS FOR A PROCESSING AND POWER GENERATING MACHINE

[75] Inventor: Rolf Martin, Sonthofen, Allgau, Germany

[73] Assignee: BHS-Bayerische Berg-, Hutten- und Salzerke Aktiengesellschaft, Munich, Germany

[22] Filed: Feb. 6, 1975

[21] Appl. No.: 547,665

[30] Foreign Application Priority Data
Feb. 6, 1974  Germany............................ 2405721.

[52] U.S. Cl. ................................................. 74/405
[51] Int. Cl.² ........................................ F16H 57/00
[58] Field of Search........................ 74/405, 384, 385

[56] References Cited
UNITED STATES PATENTS

| | | | |
|---|---|---|---|
| 3,021,719 | 2/1962 | Conrad, Jr. ....................... | 74/405 X |
| 3,168,840 | 2/1965 | Williams ......................... | 74/405 UX |
| 3,180,168 | 4/1965 | Harris ................................. | 74/405 |

*Primary Examiner*—Leonard H. Gerin
*Attorney, Agent, or Firm*—Silverman & Cass, Ltd.

[57] ABSTRACT

An alignment device for machines which, after the shut-down of the machine, keeps the rotor in rotation until it has cooled down in order to avoid damage to the machine.

The device comprises a gear element which at a certain number of revolutions of the rotor of the machine engages a gear element of the machine.

The device may also initiate alignment from an idle position of the machine.

6 Claims, 2 Drawing Figures

3,960,028

ROTOR ALIGNMENT APPARATUS FOR A PROCESSING AND POWER GENERATING MACHINE

BACKGROUND OF THE INVENTION

The invention relates to a rotor alignment apparatus for processing and power generating machines, comprising a gear propelled by a drive motor, whose pinion is arranged on a locking and unlocking pivoting apparatus, and whose locking and unlocking is controlled by the processing and power generating machine by means of recorders of the number of revolutions.

For example, gas turbines, steam turbines, compressors etc. are applicable as processing and power generating machines, all of which operate at high temperatures. If such machines are shut down while still in a hot operating condition, the rotor is subjected to a sagging which it maintains after cooling. Then it is no longer balanced. In order to avoid this very disadvantageous imbalance, so-called rotor aligning devices or aligning apparatuses were developed which keep the rotor in rotation until it has been cooled down completely, at a low number of revolutions. This avoids the disadvantageous sagging of the rotor.

In this connection a rotor alignment device has been known which propels the entire shaft strand of a processing and power generating machine in order to avoid uneven cooling of the rotors following the shutdown of the entire installation. The breaking loose and the subsequent rotating of the entire system for starting is likewise accomplished with the aid of this rotor alignment apparatus.

It is disadvantageous in these known rotor alignment apparatuses that stopping of the entire mechanical system must first be awaited so that then the aligning can be accomplished. Thus, the machinist must observe the installation until it has come to a stop and only then the rotor alignment apparatus can be put into operation.

SUMMARY OF THE INVENTION

In contrast previously known apparatuses, the present invention has the object of providing a rotor alignment apparatus of the initially referred to type which can be operated in a much more simplified manner and which automatically aligns the entire installation.

According to the invention, this object is achieved by connecting a toothed rim fastened to the shaft of the processing and power generating machine with a shut-down transmitter controlling the stroke magnet and the drive motor of the rotor alignment apparatus, for automatically starting and aligning the installation from its stopped position. This results in the advantage that only pursuant to the pushing of a push button by the machinist the entire installation can be aligned, and/or that after the installation has been shut down the aligning with the rotor alignment apparatus is carried out automatically under the control of the processing and power generating machine.

In addition, it is possible thereby that following disconnection of the entire installation it is not necessary to wait until it comes to a complete standstill, but that the pivoting apparatus controlled by the processing and power generating machine already is connected automatically during the disconnecting of the installation, without the machinist having to concern himself about the rotor alignment apparatus. The recorder for the number of revolutions may be designed electrically or mechanically.

According to another characteristic of the invention the drive motor of the rotor alignment apparatus is provided with an electrical installation for the energy-less meshing of the pinion into the toothed rim via a star $\lambda$ delta $\Delta$ circuit and series resistances, and after the meshing it switches the drive motor from star $\lambda$ to delta $\Delta$ and shorts the series resistances. This advantageously avoids detrimental charges upon the mechanical and electrical system of the entire installation, resulting in a simple manner in the energy-less meshing of the pinion into the toothed rim. As soon as the engagement is established between the pinion of the rotor alignment apparatus and the toothed wheel, the drive motor of the rotary alignment apparatus is switched and the alignment operation can commence.

According to another feature of the invention the aligning is carried out from the free wheeling of the installation upon reaching the alignment rpm by means of revolution recorders. As stated above, these may be electrical or mechanical revolution recorders. These revolution recorders make possible a comparison of the revolutions between the number of revolutions of the shaft of the free-wheeling processing and power generating machine and the number of revolutions of the drive motor of the rotor alignment apparatus, so that the rotor alignment apparatus can be connected at the proper moment.

Under a further improvement of the invention, the installations for the alignment from the stopped position and from the free wheeling of the installation can be combined, so that advantageously an additional improvement of the entire installation and of the automatic course will result.

According to another feature of the invention, a stroke magnet controlled by the revolution recorder operates a ratchet unlocking the pivoting apparatus. This ratchet causes the pinion to be meshed at the right moment in the toothed rim of the processing and power generating machine.

The invention is described hereafter in greater detail with reference to a preferred embodiment illustrated in the drawings.

DESCRIPTION OF THE PREFERRED EMBODIMENTS

Figure 1:
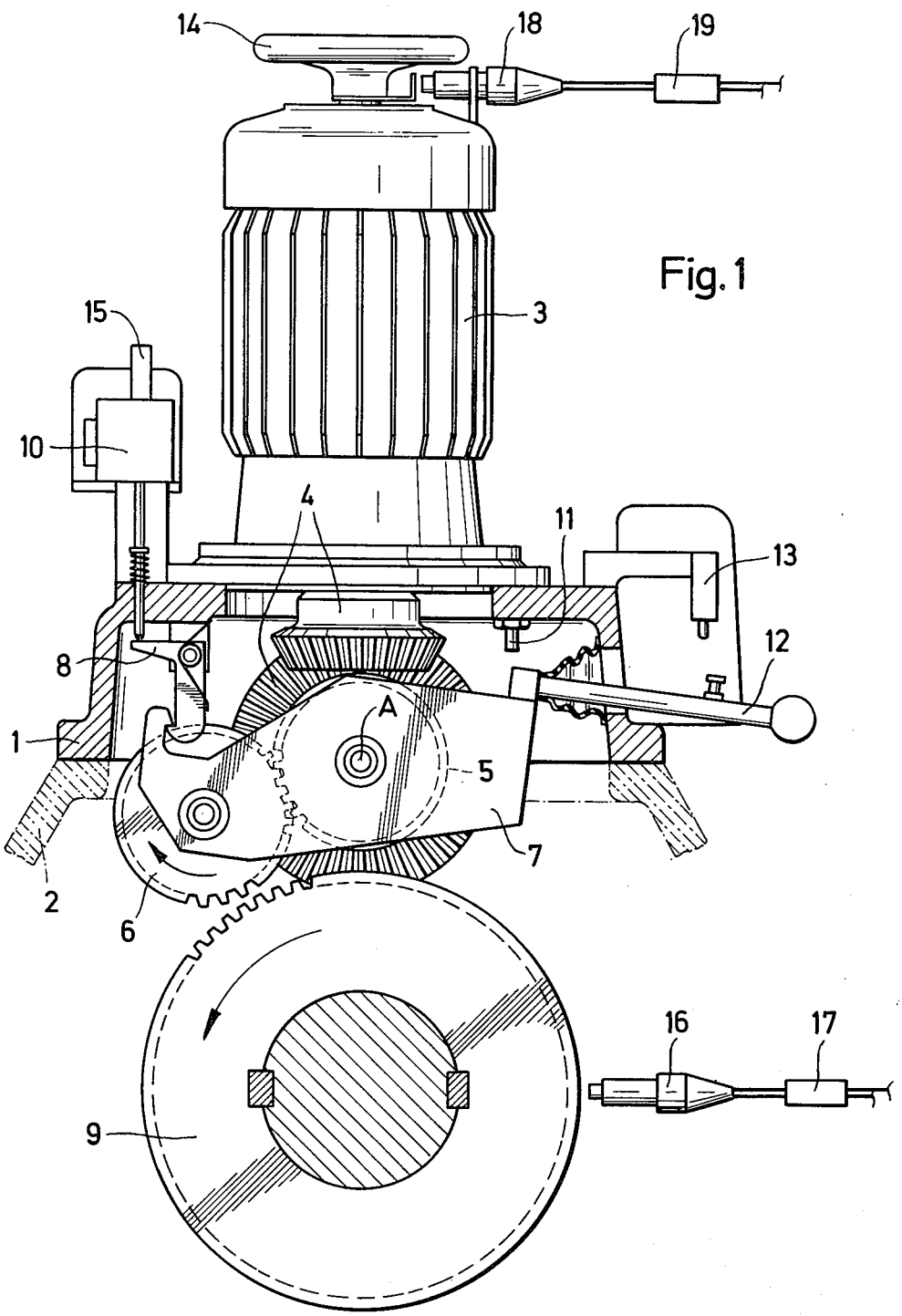
FIG. 1 is a schematic lateral view of the entire rotor alignment apparatus constructed according to the invention with the pivoting pinion disconnected.
Figure 2:
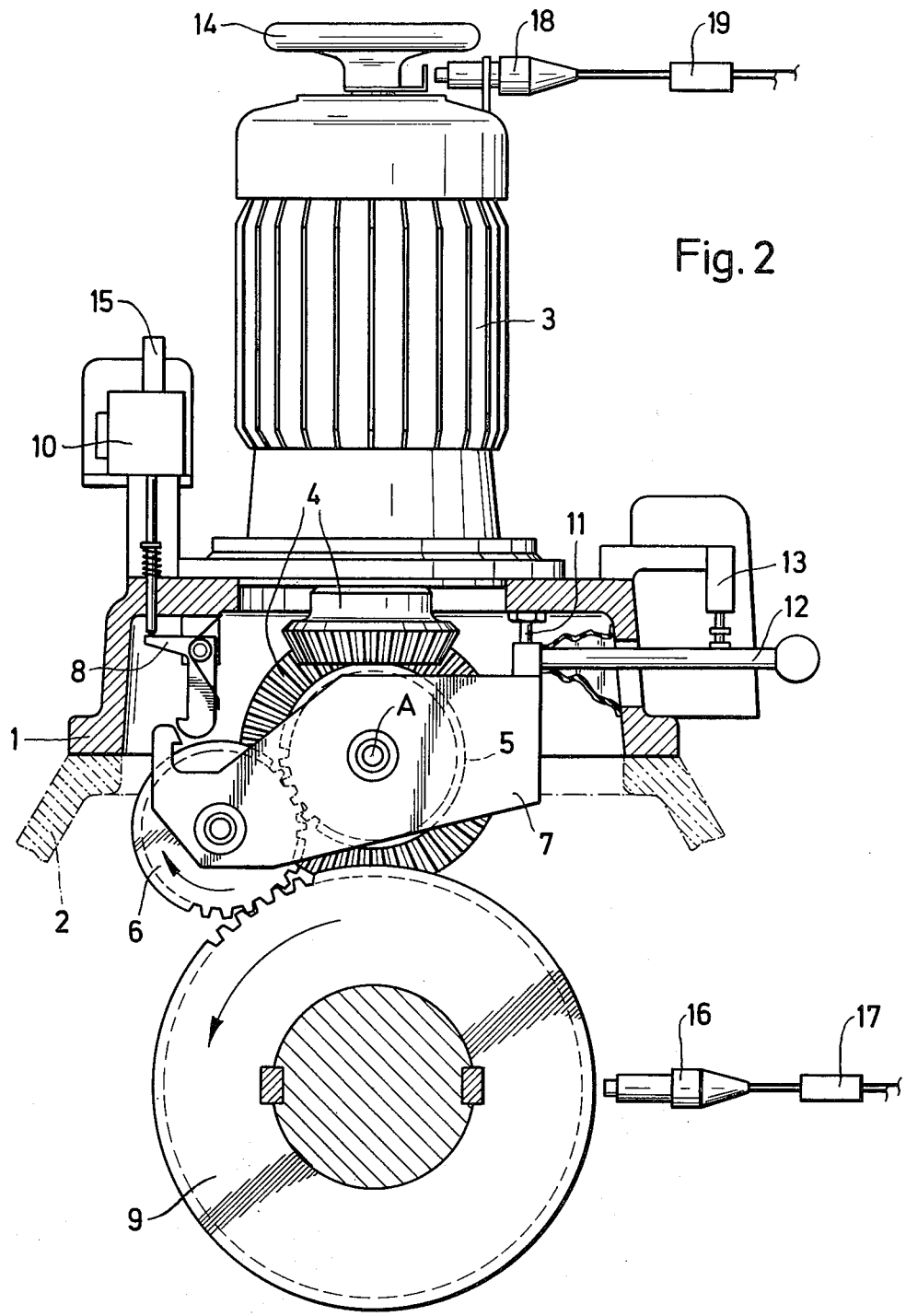
FIG. 2 is a similar view with the pivoting pinion being connected.

According to the drawings, the rotor alignment apparatus comprises a housing 1, mostly located on a bearing cover or a clutch housing 2. The gear motor 3 flanged to the housing 1 in construction form V1 serves as the drive motor of the rotor alignment apparatus according to the invention and propels the pivoting pinion 6 via a pair of bevel wheels 4 and a connecting gear wheel 5.

This pivoting pinion 6 is positioned at a pivoting arm 7 which is pivotable about the shaft A. With the aid of a latch 8 the pivoting arm 7 is stopped in the inoperative position. To make possible the engagement of the pivoting pinion 6 with the toothed rim 9 fixed to the rotor of the processing and power generating machine, a stroke magnet 10 is located above the latch 8 in a pressure design which if necessary opens the latch 8 and thus releases the pivoting arm. A stop 11 thereby prevents a jamming in the serrations between the pivoting pinion 6 and the toothed rim 9.

In the operating position, that is when the pivoting pinion 6 is engaged with the toothed rim 9, a circuit is closed by the position of a switching lever 12 via a terminal switch 13. In addition, a revolution recorder 16 is arranged with the amplifier 17 proximal to the toothed rim 9, while in addition, in the vicinity of the handwheel 14 making possible the manual operability of the rotor alignment apparatus, revolution recorders 18 are provided with amplifiers 19. The rotor alignment apparatus according to the invention operates in the following manner:

At first, it is possible to automatically start the entire installation from a stopped position. It is a prerequisite for this that the number of revolutions of the processing and power generating machine is zero. This start from the stopped position is accomplished either by a machinist pressing a push button or by the stopped position transmitter 16 and 17. As soon as the installation shows the rpm of zero, either the machinist can co-connect the rotor alignment apparatus, or the stop position transmitter 17 and 16 determines the rpm of zero of the entire installation and automatically connects the rotor alignment apparatus for aligning. Thus, the stop position transmitter 16 and 17 transmits an impulse when the free wheeling rotor of the processing and power generating machine has reached the rpm of zero.

After connecting, for example by means of a push button or via the stop position transmitter 16 and 17, the unlocking of the pivoting arm 7 takes place via known electrical components, via the stroke magnet 10. At the same time, the pivoting pinion is meshed into the toothed rim 9 in such a manner that the drive motor 3 is started in star ($\lambda$—) circuit with the series resistance circuit, so that the pivoting pinion 6 meshes without energy into the toothed rim 9. If the meshing of the pivoting pinion 6 already should have taken place accidentally during the unlocking of the pivoting arm 7, the operation of meshing with star ($\lambda$—) circuit and series resistance is dispensed with. As soon as the serrated engagement between the pivoting pinion 6 and the toothed rim 9 is established, the drive motor 3 is switched via the terminal switch 13 from star ($\lambda$—) circuit to delta ($\Delta$—) circuit, wherein the series resistance is taken out. Now the aligning operation starts. During the run-up of the system from the aligning operation, the pivoting pinion automatically disengages when the operating condition of the processing and power generating machine is to be restored, wherein the pivoting arm 7 is locked in the ratchet. This automatic disengagement is accomplished in that the toothed rim, due to increasing number of revolutions, urges the pivoting pinion 6 out of the serrated engagement, so that the latch 8 can again lock the pivoting arm 7 and the pivoting pinion thus becomes disengaged from the toothed rim 9. The gear motor 3 is disconnected by opening of the terminal switch 13.

According to another embodiment of the invention the rotor alignment apparatus already can be connected during the free wheeling of the installation so that advantageously complete stopping of the entire installation need not be awaited. This automatic starting of the entire installation with the free wheeling rotor of the processing and power generating machine again is accomplished with the aid of the revolution recorders 16 and 17.

If the installation is shut down, the rotor of the processing and power generating machine slowly coasts to a stop. During this coasting the electric revolution recorder 16 turns on the drive motor 3 of the rotor alignment apparatus at locked pivoting arm 7 at the toothed rim 9 via the amplifier instrument 17, at a number of revolutions which is approximately above 75 percent of the rpm of the rotating device.

Here, the pivoting pinion 6 rotates, without being engaged with the toothed rim 9, at a circumferential speed corresponding with that of the toothed rim 9 at the alignment rpm. As a control of the number of revolutions of the pivoting pinion a revolution recorder 18 with amplifier instrument 19 is mounted in the proximity of the co-rotating handwheel 14.

If now the coasting installation of the processing and power generating machine reaches a number of revolutions which is equal to or slightly below that of the rotating rpm, the pivoting arm 7 is automatically unlocked with the rotating pivoting pinion 6 via known electrical members with the aid of the stroke magnet 10.

Both wheels, namely the pivoting pinion 6 and the toothed rim 9, rotate approximately synchronously and come to mesh. This meshing is positive because the rpm of the toothed rim is reduced. The flux of power now takes place from the rotor alignment apparatus so that the entire installation continues to operate at the corresponding rotating rpm.

The operation of the stroke magnet 10 and thus the unlocking of the pivoting arm 7 only takes place if it is signaled via both revolution recorders 16 and 18 that on the one hand the drive motor 3 operates at the proper rpm and that on the other hand the alignment rpm is just reached or slightly therebelow at the toothed rim 9.

Electrically the circuit is so laid out that this course can take place only at decreasing rpm, that is from the coasting of the overal installation and not during the starting of the installation.

With the aid of the rotor alignment apparatus according to the invention, it is thus possible to execute two variants in the alignment operation:

1. Starting the installation of the processing and power machine from the stop, for example by manual operation by the machinist or via the stop position transmitter, that is the revolution recorder 16. It is a prerequisite for this that the number of revolutions of the overal installation is zero.

2. Starting the rotor alignment apparatus at coasting rotor of the processing and power generating machine. In this respect the revolution recorders 16 and 17 have two functions: on the one hand the revolution recorder 16 turns on the drive motor 3 of the rotor alignment apparatus at an rpm of the rotor of the installation when it is 75 percent above the alignment rpm. Moreover, the stroke magnet 10 is actuated thus causing unlocking of the pivoting arm 7 when the alignment rpm is reached or slightly therebelow.

As soon as the entire system has been aligned for proper operation, the automatic disengagement of the pivoting pinion 6 again takes place in a known manner.

It is possible in this connection to provide both above mentioned automatic courses in one installation so that the aligning can be executed both from the stop and with the coasting rotor of the installation.

What it is desired to secure by Letters Patent of the United States is:

1. A rotor alignment apparatus for a processing and power generating machine comprising, a drive motor, a gear propelled by said drive motor, a pinion carried by a locking and unlocking pivoting apparatus arranged to move the pinion into and out of driving engagement with said gear, at least one revolution recorder associated with said machine, the locking and unlocking of said pivoting apparatus being controlled by the recorder through signals received from the machine, the machine including a toothed rim carried on a shaft thereof, a shutdown transmitter associated with said rim and a stroke magnet associated with said pivoting apparatus, said shutdown transmitter being controllably connected with the stroke magnet and the drive motor for automatically starting and aligning the apparatus from a stopped condition.

2. An alignment apparatus as claimed in claim 1 in which the drive motor includes electrical means for enabling energy-less meshed engagement of said pinion with said toothed rim, said electrical means including a star-delta ($\lambda$-$\Delta$-) circuit and series resistances, whereby upon engagement of the pinion with the rim the electrical means will switch the drive motor from star ($\lambda$) to delta ($\Delta$) and short the series resistances.

3. An alignment apparatus as claimed in claim 1 in which alignment of the rotor from free wheeling or coasting upon reaching its alignment speed is effected by said at least one revolution recorder.

4. An alignment apparatus as claimed in claim 3 including a latch operatively associated with said pivoting apparatus to lock the same, said latch being actuated by said stroke magnet to unlock the pivoting apparatus.

5. An alignment apparatus as claimed in claim 1 in which the alignment apparatus is operable to align the rotor from both a stopped or a coasting condition.

6. An alignment apparatus as claimed in claim 5 including a latch operatively associated with said pivoting apparatus to lock the same, said latch being actuated by said stroke magnet to unlock the pivoting apparatus.

* * * * *